Oct. 20, 1936.  F. H. EHNTS  2,058,219
LUBRICATING NOZZLE
Filed Feb. 5, 1936
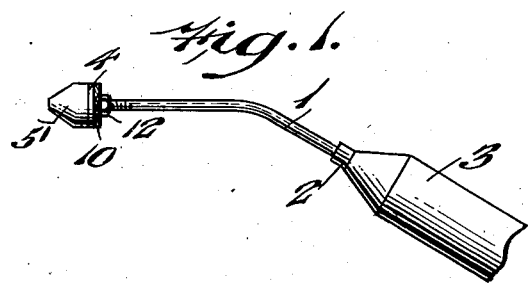
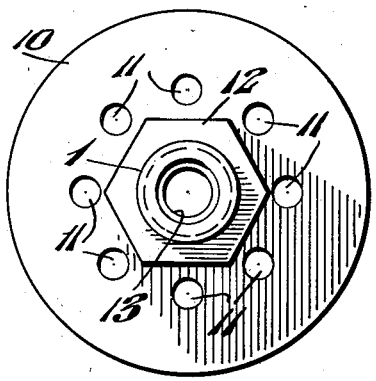
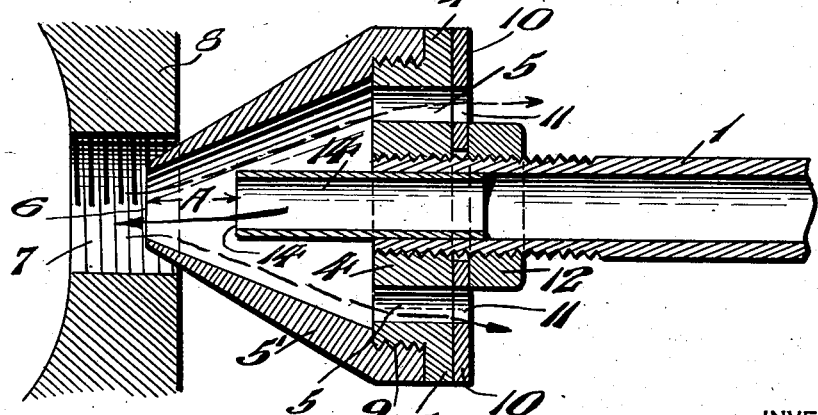
INVENTOR
FRED H. EHNTS.
BY
Wm. G. Schmidt
ATTORNEY Patented Oct. 20, 1936

2,058,219

UNITED STATES PATENT OFFICE 2,058,219

LUBRICATING NOZZLE

Fred. Henry Ehnts, Philadelphia, Pa., assignor of one-half to Franz Karl Schneider, Philadelphia, Pa.

REISSUED

Application February 5, 1936, Serial No. 62,430

4 Claims. (Cl. 285—161)

My invention relates generally to greasing or lubricating apparatus and more particularly to improvements in back-pressure indicating nozzles through which grease is discharged into bearings.

One of the objects is to provide a nozzle that is readily applied to the filling vent of a bearing for the purpose of filling the bearing with the required quantity of grease at a predetermined and a desirable operating pressure. In the specialized field of bearing lubrication, the practice has been heretofore to inject the grease into a bearing under pressure without a means of ascertaining whether the pressure is adequate or not. Not infrequently the zealous operator in a spirit of excess caution fills the bearing with grease under too great a pressure, thus expressing a faulty lubricating technique that may result in heating the grease excessively and cause the bearing to run "hot" and to become irreparably damaged. My invention avoids the hazards of direct pressure greasing by indicating in a visible manner when the bearing is filled with the required quantity of grease under a proper pressure.

Another object of my invention is to provide a nozzle that will indicate to the operator any irregular or unanticipated obstruction existent in the bearing that may be caused by solidified grease or other factors. Should the bearing really require greasing and, nevertheless, the nozzle expels grease from its rear surface when the gun discharges grease into the bearing, the operator is immediately apprized of a defective condition in the bearing that may be imputable to a number of causes.

A further object of my invention is to provide a nozzle that can be readily adjusted to serve as a direct high pressure discharging nozzle to be attached to a pressure gun of either the continuous or intermittent feeding type.

For the purpose of illustrating my invention I have shown in the accompanying drawing forms thereof which are at present preferred by me, since the same have been found in practice to give satisfactory and reliable results, although it is to be understood that the various instrumentalities of which my invention consists can be variously arranged and organized and that my invention is not limited to the precise arrangement and organization of the instrumentalities as herein shown and described.

My invention relates to several other novel features of construction and advantage appearing as hereinafter described and claimed in connection with the accompanying drawing in which:

Fig. 1 represents on a reduced scale the nozzle attached to a grease gun.

Fig. 2 represents an end view of the nozzle.

Fig. 3 represents a longitudinal sectional view of the nozzle.

Referring to the drawing in which like reference characters indicate like parts, 1 is a length of metal tubing that may be pressed straight or angled and which is attached at one end through a universal joint 2 to a metering or measuring grease gun 3. At the other end the tube 1 engages threadedly with the cap 4 which in a manner similar to a ferrule engages threadedly with the orifice element 5'. The cap 4 is perforated with a plurality of holes 5, constant in diameter and distributed uniformly on a circumference concentric with the external periphery of the cap 4. The orifice element 5' approximates in shape and contour a truncated hollow cone with its smaller opening 6 adapted to enter for a short distance the filling vent 7 of the bearing housing 8. The base or the larger opening 9 of the orifice element 5' is threaded to engage the cap 4. Over the tube 1 and bearing on the cap 4 is the perforated washer 10, the holes 11 of which are distributed on a circumference that coincides with a similar circumference on the cap 4 but the diameters of which vary slightly between close limits. The washer 10 can be rotated freely about the tube 1 and, accordingly, can be set in an indefinite number of positions relatively to the perforated cap 4, ranging from a position in which all of the perforations of the cap 4 are closed to a position in which all of the aforesaid perforations are open. The lock nut 12 threaded to engage the tube 1 serves to hold securely the washer 10 in any predetermined relationship with the cap 4.

A thin walled cylindrical tube 13 is fitted snugly into the smooth bore of the threaded tube 1 and is adjustable in that its end 14 can be advanced toward or withdrawn from the smaller end of the orifice element 5'. If the distance A is decreased then the back pressure at which the excess grease is extruded from the bearing 8 is increased; and if the distance A is increased then the excess grease from the filled bearing 8 exudes at a reduced back pressure.

The manner in which my device can be utilized becomes obvious when its operation is more fully described. The grease gun 3 is of the metering or measuring type and with every release of its trigger a definite quantity of grease approximately .07 oz., is discharged, as indicated by the solid arrow, through the orifice element opening 6 into the filling vent 7 of the bearing 8. For greasing a bearing where the pressure of the grease must be maintained at a definite and prescribed pressure the washer 10 is rotated to such a degree that its holes 11 coincide with the perforations 5 of the cap 4, thus affording a plurality of unobstructed passage ways throughout the enlarged end 15 of the nozzle. When a sufficient quantity of grease at a proper pressure has been admitted to the bearing 8 then the excess grease is expelled at a pressure of approximately 1.5 ounces along the paths indicated by the broken arrows in Fig. 3 through the perforations 5 and 11, indicating immediately to the operator that the bearing 8 has been correctly and adequately greased. The universal joint 2 attaching the nozzle to the gun 3 enables the operator to apply grease to bearings that are situated in awkward or comparatively inaccessible places.

Should the operator desire, he can quickly release the lock nut 12, rotate the washer 10 in such a manner that the perforations 5 are closed, and proceed to use the nozzle on any type of gun as a pressure gun.

While the construction as shown and described is the preferred embodiment of my device, nevertheless the same may be modified in detail without departing from the spirit and the scope of the invention as defined in the annexed claims.

Having thus described my invention, I claim as new and desire to secure by Letters Patent:

1. A nozzle comprising an orifice element in combination with a tube in adjustable relationship with said orifice element, a perforated cap adapted to engage with said orifice element, a delivery tube adapted to engage with said perforated cap, a perforated washer and a lock nut adapted to engage with said delivery tube.

2. A nozzle adaptable to a metering gun comprising an orifice element in combination with a tube in adjustable relationship with said orifice element, a perforated cap adapted to engage with said orifice element, a delivery tube adapted to engage with said perforated cap, a perforated washer and a lock nut adapted to engage with said delivery tube.

3. A nozzle adaptable to a metering gun serving the function of indicating excessive pressure of grease in a bearing lubricated by the said metering gun and comprising an orifice element in combination with a tube in adjustable relationship with said orifice element, a perforated cap adapted to engage with said orifice element, a delivery tube adapted to engage with said perforated cap, a perforated washer and a lock nut adapted to engage with said delivery tube.

4. A nozzle adaptable to a pressure gun comprising an orifice element in combination with a tube in adjustable relationship with said orifice element, a perforated cap adapted to engage with said orifice element, a delivery tube adapted to engage with said perforated cap, a perforated washer and a lock nut adapted to engage with said delivery tube and to close said perforated cap.

FRED HENRY EHNTS.